(12) United States Patent
Chen et al.

(10) Patent No.: US 11,711,285 B2
(45) Date of Patent: Jul. 25, 2023

(54) METHOD, APPARATUS, ELECTRONIC DEVICE AND READABLE STORAGE MEDIUM FOR ADJUSTING INSTANCE NUMBER

(71) Applicant: BEIJING BAIDU NETCOM SCIENCE AND TECHNOLOGY CO., LTD., Beijing (CN)

(72) Inventors: Sheng Chen, Beijing (CN); Danfeng Lu, Beijing (CN); Xin Zhao, Beijing (CN); Jingru Xie, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 52 days.

(21) Appl. No.: 17/201,663

(22) Filed: Mar. 15, 2021

(65) Prior Publication Data
US 2021/0243110 A1 Aug. 5, 2021

(30) Foreign Application Priority Data
Sep. 21, 2020 (CN) .......................... 202010992655.7

(51) Int. Cl.
*H04L 43/16* (2022.01)
*H04L 43/08* (2022.01)
*G06F 9/50* (2006.01)
*H04L 43/0876* (2022.01)
*G06F 9/455* (2018.01)

(52) U.S. Cl.
CPC .............. *H04L 43/16* (2013.01); *G06F 9/505* (2013.01); *G06F 9/5072* (2013.01); *H04L 43/08* (2013.01);
(Continued)

(58) Field of Classification Search
CPC ................... G06F 9/505; G06F 9/5072; G06F 2009/45562; G06F 2009/44575; H04L 43/08; H04L 43/0876; H04L 43/16
See application file for complete search history.

(56) References Cited

U.S. PATENT DOCUMENTS 10,540,268 B2 * 1/2020 Segler ..................... G06F 11/34
10,944,816 B2 * 3/2021 Guniguntala ......... H04L 67/562
(Continued)

FOREIGN PATENT DOCUMENTS

CN 110868310 A 3/2020
CN 111338760 A 6/2020
(Continued)

OTHER PUBLICATIONS

Shiqiang Wang et al. "Adaptive Federated Learning in Resource Constrained Edge Computing Systems", IEEE Journal on Selected Areas in Communications, vol. 37, No. 6, Jun. 2019, 17 pages. (Year: 2019).*
(Continued)

*Primary Examiner* — George C Neurauter, Jr.
(74) *Attorney, Agent, or Firm* — Kilpatrick Townsend & Stockton LLP (57) ABSTRACT

A method, an apparatus, an electronic device and a computer readable storage medium for adjusting an instance number are provided. The method includes: acquiring an actual performance index of a current time window; determining a theoretical instance number corresponding to the actual performance index; and in response to the theoretical instance number being greater than an instance creating upper limit of a current edge computing node, requesting another edge computing node having an instance addition capability to jointly create an instance of a total number equal to the theoretical instance number.

15 Claims, 4 Drawing Sheets

(52) U.S. Cl.
CPC ............. *G06F 2009/45562* (2013.01); *G06F 2009/45575* (2013.01); *H04L 43/0876* (2013.01)

(56) References Cited

U.S. PATENT DOCUMENTS

| | | | |
|---|---|---|---|
| 11,354,162 B2* | 6/2022 | Ganteaume | ............. H04L 43/16 |
| 2019/0220703 A1 | 7/2019 | Prakash et al. | |
| 2021/0240536 A1* | 8/2021 | Brazeau | ............. G06F 11/3409 |

FOREIGN PATENT DOCUMENTS

| | | |
|---|---|---|
| CN | 111371603 A | 7/2020 |
| JP | 2002-342193 A | 11/2002 |
| JP | 2019-144864 A | 8/2019 |
| WO | 2019/111411 A1 | 6/2019 |
| WO | 2020/161788 A1 | 8/2020 |

OTHER PUBLICATIONS

Tiago Gama Rodrigues et al. "Cloudlets Activation Scheme for Scalable Mobile Edge Computing with Transmission Power Control and Virtual Machine Migration", IEEE Transactions on Computers, vol. 67, No. 9, Sep. 2018, 14 pages. (Year: 2018).*
Nikos Tziritas et al. "Data Replication and Virtual Machine Migrations to Mitigate Network Overhead in Edge Computing Systems", IEEE Transactions on Sustainable Computing, vol. 2, No. 4, Oct.-Dec. 2017, 13 pages. (Year: 2017).*
European Search Report dated Sep. 3, 2021 in related European Patent Application No. 21161920.0 (seven pages).

* cited by examiner

METHOD, APPARATUS, ELECTRONIC DEVICE AND READABLE STORAGE MEDIUM FOR ADJUSTING INSTANCE NUMBER

CROSS-REFERENCE TO RELATED APPLICATIONS

This application claims the priority of Chinese Patent Application No. 202010992655.7, titled "METHOD, APPARATUS, ELECTRONIC DEVICE AND READABLE STORAGE MEDIUM FOR ADJUSTING INSTANCE NUMBER", filed on Sep. 21, 2020, the content of which is incorporated herein by reference in its entirety.

TECHNICAL FIELD

The present disclosure relates to the technical field of multi-device collaboration processing, in particular, to the technical fields of edge computing, service instance adjustment and computing node collaboration, and more in particular, to a method, apparatus, electronic device and computer readable storage medium for adjusting an instance number.

BACKGROUND

With the development of electronic informationization and intellectualization, edge computing devices closest to a user terminal play an increasingly important role, and an edge computing network composed of many edge computing nodes has become a research focus.

SUMMARY

Embodiments of the present disclosure provide a method, apparatus, electronic device and computer readable storage medium for adjusting an instance number.

In a first aspect, an embodiment of the present disclosure provides a method for adjusting an instance number, and the method includes: acquiring an actual performance index of a current time window; determining a theoretical instance number corresponding to the actual performance index; and in response to the theoretical instance number being greater than an instance creating upper limit of a current edge computing node, requesting another edge computing node having an instance addition capability to jointly create an instance of a total number equal to the theoretical instance number, where different edge computing nodes have different instance creating upper limits due to a performance difference.

In a second aspect, an embodiment of the present disclosure provides an apparatus for adjusting an instance number, and the apparatus includes: an actual performance index acquisition unit configured to acquire an actual performance index of a current time window; a theoretical instance number determining unit configured to determine a theoretical instance number corresponding to the actual performance index; and an instance addition collaboration unit configured to, in response to the theoretical instance number being greater than an instance creating upper limit of a current edge computing node, request another edge computing node having an instance addition capability to jointly create an instance of a total number equal to the theoretical instance number, where different edge computing nodes have different instance creating upper limits due to a performance difference.

In a third aspect, an embodiment of the present disclosure provides an electronic device, and the electronic device includes: at least one processor; and a memory communicating with the at least one processor, where the memory stores instructions executable by the at least one processor, and the instructions, when executed by the at least one processor, cause the at least one processor to implement the method for adjusting the instance number as described in any one of the implementations of the first aspect.

In a fourth aspect, an embodiment of the present disclosure provides a non-transitory computer readable storage medium storing computer instructions for causing a computer to implement the method for adjusting the instance number as described in any one of the implementations of the first aspect.

According to the method, apparatus, electronic device and computer readable storage medium for adjusting the instance number provided by the embodiments of the present disclosure, the actual performance index of the current time window is first acquired; then, the theoretical instance number corresponding to the actual performance index is determined; and finally, in response to the theoretical instance number being greater than the instance creating upper limit of the current edge computing node (different edge computing nodes have different instance creating upper limits due to the performance difference), the another edge computing node having the instance addition capability is requested to jointly create the instance of the total number equal to the theoretical instance number.

It should be appreciated that the content described in this part is not intended to identify the key or critical features of the embodiments of the present disclosure, nor is it intended to limit the scope of the present disclosure. The other features of the present disclosure will become easy to understand through the following description.

BRIEF DESCRIPTION OF THE DRAWINGS

After reading the detailed description of non-limiting embodiments with reference to the following accompanying drawings, other features, objectives and advantages of the present disclosure will be more apparent.

DETAILED DESCRIPTION OF EMBODIMENTS

The present disclosure will be described below in detail in combination with the accompanying drawings and the embodiments. It should be appreciated that the specific embodiments described herein are merely used for explaining the related disclosure, rather than limiting the present disclosure. In addition, it should be noted that, for the ease of description, only the parts related to the present disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
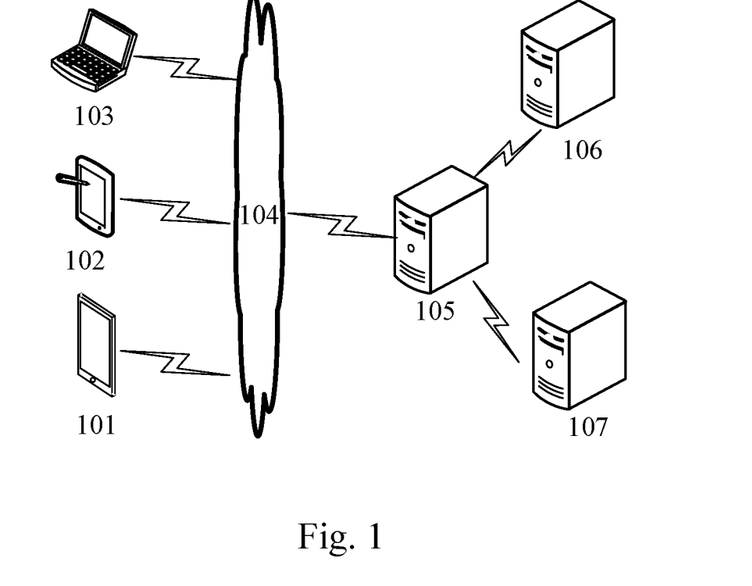
FIG. 1 is an example system architecture in which the present disclosure may be applied.

FIG. 1 shows an example system architecture 100 in which a method, apparatus, electronic device and computer readable storage medium for adjusting an instance number according to embodiments of the present disclosure may be applied.

As shown in FIG. 1, the system architecture 100 may include terminal devices 101, 102 and 103, a network 104, a current edge computing node 105 and other edge computing nodes 106 and 107. The network 104 serves as a medium for providing a communication link between the terminal devices 101, 102 and 103 and the current edge computing node 105, and the network 104 may also be used to connect the current edge computing node 105 with the other edge computing nodes 106 and 107 (not shown). The network 104 may include various types of connections, such as wired or wireless communication links, or optic fiber cables.

A user may use the terminal devices 101, 102 and 103 to interact with the current edge computing node 105 through the network 104 to receive or send messages. The terminal devices 101, 102 and 103 and the current edge computing node 105 may be provided with various applications for implementing information communication between the terminal device and the current edge computing node, such as an instant messaging application and a data query application. The current edge computing node 105 and the other edge computing nodes 106 and 107 may also be provided with applications for implementing information communication between the current edge computing node and the other edge computing node, such as an instance collaboration addition application and a data forwarding application.

The terminal devices 101, 102 and 103, the current edge computing node 105 and the other edge computing nodes 106 and 107 may be hardware or software. When the terminal devices 101, 102 and 103 are hardware, the hardware may be various electronic devices having display screens, including but not limited to, a smart phone, a tablet computer, a laptop portable computer and a desktop computer; and when the terminal devices 101, 102 and 103 are software, the software may be installed in the electronic devices, and may be implemented as multiple software pieces or software modules, or as a single software piece or software module, which is not specifically limited herein. When the edge computing nodes (including the current edge computing node 105 and the other edge computing nodes 106 and 107) are hardware, the hardware is generally a single electronic device having a computing capability, such as a workstation and a server; and when the edge computing nodes are software, the software may be implemented as multiple software pieces or software modules, or as a single software piece or software module, which is not specifically limited herein.

The edge computing nodes may provide various services through various built-in applications. Taking the instance collaboration addition application that provides a service instance collaboration addition service when the current edge computing node faces a service load that exceeds a processing capability of the current edge computing node in a short time as an example, the current edge computing node 105 may achieve the following effects when running the instance collaboration addition application: to-be-processed traffic sent by the terminal devices 101, 102 and 103 in the current time window is first received through the network 104, and the actual performance index is determined according to the to-be-processed traffic; then, the theoretical instance number corresponding to the actual performance index is determined; and finally, when the theoretical instance number is greater than the instance creating upper limit corresponding to the actual performance, another edge computing node having the instance addition capability (such as the other edge computing nodes 106 and 107) is requested to jointly create instances whose number is equal to the theoretical instance number. Therefore, the received to-be-processed traffic is processed by using a total service instance number equal to the theoretical instance number in collaboration with the other edge computing nodes, and the efficient and quick processing of the to-be-processed traffic is realized.

It should be appreciated that the number of the terminal devices, the network and the servers in FIG. 1 is merely illustrative. Any number of terminal devices, networks, and servers may be provided based on actual requirements.

Figure 2:
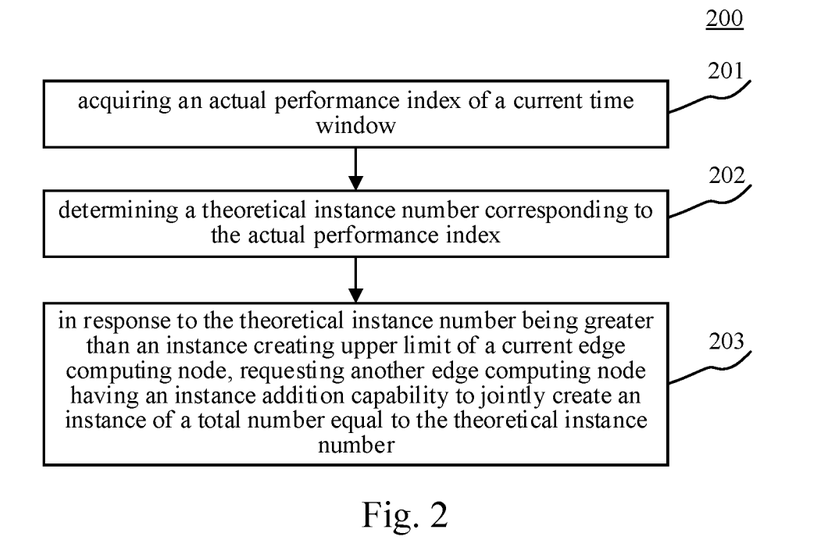
FIG. 2 is a flow chart of a method for adjusting an instance number provided by an embodiment of the present disclosure.

Further referring to FIG. 2, FIG. 2 is a flow chart of a method for adjusting an instance number provided by an embodiment of the present disclosure. The flow 200 includes steps 201 to 203.

Step 201 includes acquiring an actual performance index of a current time window.

This step is intended to acquire the actual performance index of the current time window by the execution body of the method for adjusting the instance number (such as the current edge computing node 105 shown in FIG. 1).

Each time window may be a time period with a preset duration, which does not limit the start time, or a time period that starts from the first preset time point and ends at the second preset time point. For example, every five minutes may be set as one time window, or every hour may be set as one time window, or the duration of each time window may be specifically set as one hour and this one hour must start at $31^{th}$ minute of each natural time cycle, end at $30^{th}$ minute of the next natural time cycle, which is not specifically limited herein.

The actual performance index may be calculated or obtained by conversion based on at least one of a traffic size, a wait queue length, a CPU usage rate, a memory usage rate or an instance concurrency number. The actual performance index reflects the performance to be used by the current edge computing node to complete a processing task, that is, how many resources need to be used to complete a to-be-processed task received in the current time window in a preset condition. Therefore, the actual performance index described in this step may be expressed in terms of the actual service load, that is, a simple conversion is performed by using a positive proportional relationship between the service load and the performance index. For example, the to-be-processed traffic of 10 GB is received within 5 minutes, and the actual service load is 10 GB. If the current edge computing node process at most traffic of 12G within 5 minutes at full performance, the 10 GB may be directly used as the actual performance index, or the 10 GB/12 GB=5/6 may be used as the actual performance index, which reflects that the current edge computing device needs to use 5/6 of its own full performance to process the received to-be-processed traffic.

Step 202 includes determining a theoretical instance number corresponding to the actual performance index.

On the basis of the step 201, this step is intended to determine the theoretical instance number corresponding to the actual performance index by the execution body.

Specifically, the theoretical instance number corresponding to the actual performance index may be queried in a corresponding table pre-recording a corresponding relationship between performance indexes and instance numbers. It should be appreciated that since the performance index (or the service loads) may be represented in various ways, the relationship between the performance index and the theoretical instance numbers also needs to be adjusted according to an adopted representation parameter. Assuming that the to-be-processed traffic size is still taken as the performance index, the corresponding relationship may be expressed as 2 GB→1 service instance, 4 GB→2 service instances, 6 GB→3 service instances, 8 GB→4 service instances or the like, that is, for each increase of the to-be-processed traffic of 2 GB, the execution body should add a service instance for parallel processing; assuming that the memory usage rate is taken as the performance index, the corresponding relationship may be expressed as 20%→1 service instance, 30%→2 service instances, 40%→3 service instances, 50%→4 service instances or the like, that is, each time the memory is occupied by an additional 10% on the basis of a memory occupation of 20%, the execution body should add one service instance for parallel processing. For the case where other parameters are used to represent the performance index, the relationship may be adaptively adjusted with reference to the above examples.

Further, in addition to being recorded in the form of a table, the corresponding relationship may alternatively be recorded in another way, such as a key-value pair and a hash table, or may record a theoretical instance number calculated in real time based on a calculation rule for calculating a theoretical instance number according to an actual performance index.

Step 203 includes, in response to the theoretical instance number being greater than an instance creating upper limit of a current edge computing node, requesting another edge computing node having an instance addition capability to jointly create an instance of a total number equal to the theoretical instance number.

On the basis of the step 202, this step is intended to, in response to the theoretical instance number being greater than the instance creating upper limit of the current edge computing node, request by the execution body another edge computing node having the instance addition capability to jointly create an instance of a total number equal to the theoretical instance number.

The reason why the theoretical instance number is greater than the instance creating upper limit of the current edge computing node is because not all edge computing devices functioning as edge computing nodes have same computing resources. When some edge computing nodes own a relatively small amount of computing resources, their own computing resources are insufficient to support the creation of a relatively large number of service instances to process a relatively large number of service loads in parallel. For example, an edge computing node has only 1 GB memory, which supports the creation of at most three service instances. However, due to special circumstance, the edge computing node receives the to-be-processed traffic of 10 GB in the current time window, and the theoretical instance number determined according to the step 202 is 5. In this case, the theoretical instance number is greater than the instance creating upper limit of the current edge computing node.

Since the advantage of edge computing nodes is processing a request from a user terminal nearby, how to make full use of a service processing capability of the current edge computing node closest to the user terminal is the research focus of the present disclosure.

For the case that the theoretical instance number is greater than the instance creating upper limit of the execution body (the current edge computing node), the present disclosure provides a solution that the execution body initiates an instance addition collaboration request to another edge computing node having the instance addition capability in a request way, so that service instances of a total number equal to the theoretical instance number are jointly created in collaboration with other edge computing nodes through the instance addition collaboration request.

In order to meet the requirement of creating an instance number equal to the theoretical instance number to process a corresponding service load, for the case that an edge computing node does not have a sufficient instance addition capability, the method for adjusting the instance number of the present disclosure provides a collaboration solution for multiple edge computing nodes through requesting another edge computing node having the instance addition capability, to make full use of the edge computing node having the instance addition capability to meet the current overloaded service load, thereby completing the corresponding service load processing more quickly and efficiently.

Figure 3:
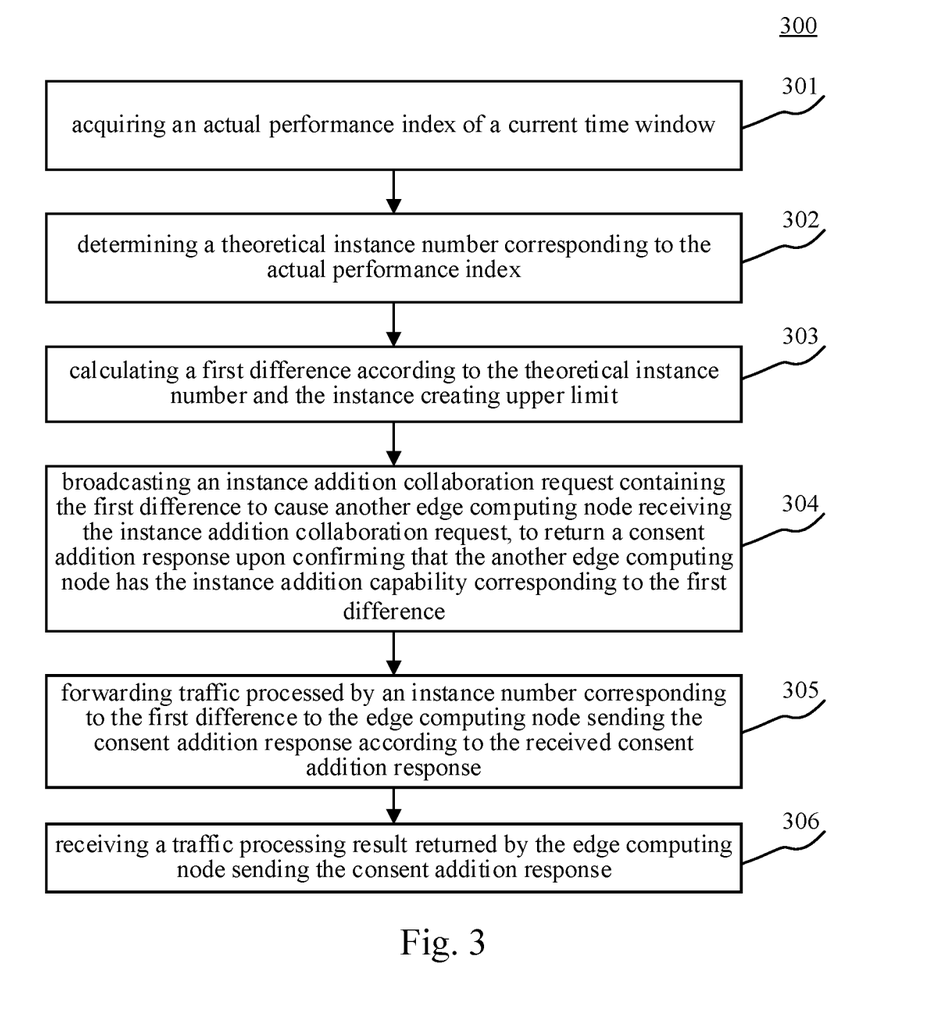
FIG. 3 is another flow chart of the method for adjusting the instance number provided by an embodiment of the present disclosure.

Referring to FIG. 3, FIG. 3 is another flow chart of the method for adjusting the instance number provided by an embodiment of the present disclosure, and the flow 300 includes steps 301 to 306.

Step 301 includes acquiring an actual performance index of a current time window.

Step 302 includes determining a theoretical instance number corresponding to the actual performance index.

The above steps 301 and 302 are consistent with the steps 201 and 202 shown in FIG. 2. the contents of the same part refer to the corresponding parts of the previous embodiment, and details are not described herein.

Step 303 includes calculating a first difference according to the theoretical instance number and the instance creating upper limit.

This step is intended to calculate an instance number difference between the theoretical instance number and the instance creating upper limit by the execution body.

Step 304 includes broadcasting an instance addition collaboration request containing the first difference to cause another edge computing node receiving the instance addition collaboration request to return a consent addition response upon confirming that the another edge computing node has the instance addition capability corresponding to the first difference.

For the case that address information of other edge computing nodes is not recorded in the edge computing node, the present embodiment provides, through this step, a way for the execution body to broadcast the instance addition collaboration request containing the first difference, so that all other edge computing nodes within a broadcast receiving range may receive the instance addition collaboration request, and that a part of the other edge computing nodes confirming that they have the instance addition capability corresponding to the first difference return a consent addition response to the execution body through the address of the execution body included in the request.

Step 305 includes forwarding traffic processed by an instance number corresponding to the first difference to the edge computing node sending the consent addition response according to the received consent addition response.

On the basis of the step 304, this step is intended to confirm by the execution body that the other edge computing node may help with the instance addition according to the received consent addition response, so that the received traffic processed by the instance number corresponding to the first difference is forwarded to the edge computing node sending the consent addition response, and a destination address of the traffic forwarding may be extracted from the consent addition response.

Step 306 includes receiving a traffic processing result returned by the edge computing node sending the consent addition response.

On the basis of the step 305, this step is intended to receive by the execution body the traffic processing result returned by the edge computing node sending the consent addition response. The reason for receiving the traffic processing result is that the other node that helps the execution body to add an instance can not directly return the traffic processing result to the user. For a user terminal, the user sends the traffic to the execution body, and it should be considered that the result returned from the original route is the legal result when the processing result is obtained.

Different from the previous embodiment, the present embodiment provides through the steps 302 to 306 a specific implementation of how to implement instance addition collaboration through requesting: the execution body broadcasts the instance addition collaboration request containing the first difference, and when receiving the consent addition response returned by a part of the other edge computing nodes having the corresponding instance addition capability, establishes a data connection therebetween to implement sending and receiving of the to-be-processed traffic and the traffic processing result, thereby achieving the purpose of at least two edge computing nodes jointly creating service instances of a total number equal to the theoretical instance number to process the to-be-processed traffic received by the execution body.

Figure 4:
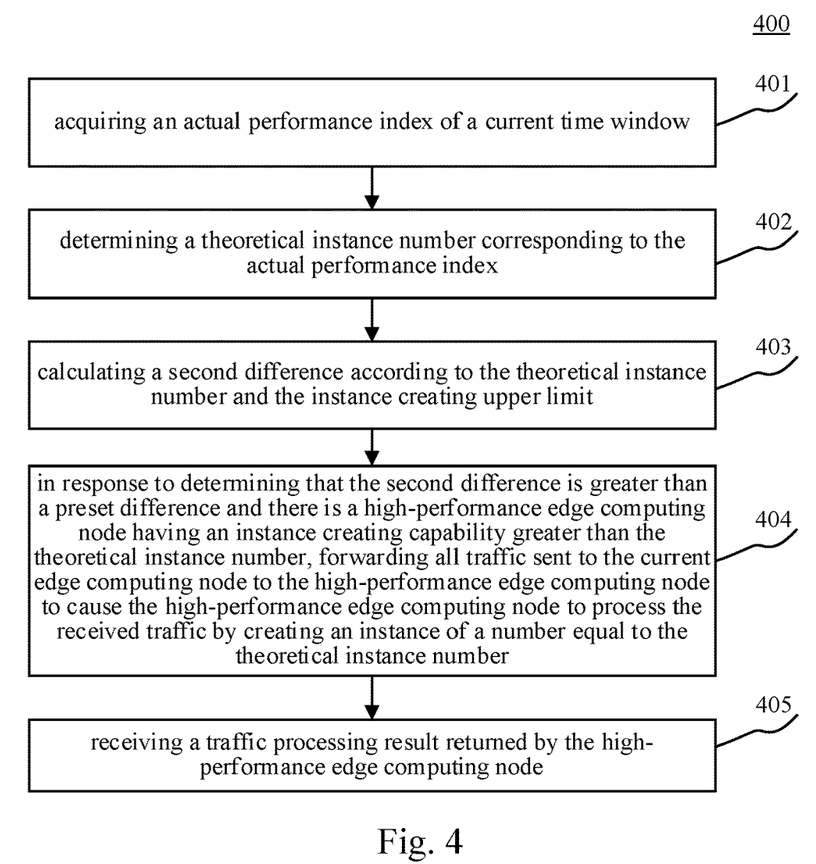
FIG. 4 is yet another flow chart of the method for adjusting the instance number provided by an embodiment of the present disclosure.

Referring to FIG. 4, FIG. 4 is yet another flow chart of the method for adjusting the instance number provided by an embodiment of the present disclosure, and the flow 400 includes steps 401 to 405.

Step 401 includes acquiring an actual performance index of a current time window.

Step 402 includes determining a theoretical instance number corresponding to the actual performance index.

The above steps 401 and 402 are consistent with the steps 201 and 202 shown in FIG. 2. The contents of the same parts refer to the corresponding parts of the previous embodiment, and details are not described herein.

Step 403 includes calculating a second difference according to the theoretical instance number and the instance creating upper limit.

This step is intended to calculate an instance number difference between the theoretical instance number and the instance creating upper limit.

Step 404 includes, in response to determining that the second difference is greater than a preset difference and a high-performance edge computing node has an instance creating capability greater than the theoretical instance number, forwarding all traffic sent to the current edge computing node to the high-performance edge computing node to cause the high-performance edge computing node to process the received traffic by creating an instance of a number equal to the theoretical instance number.

On the basis of the step 403, this step is intended to forward by the execution body all traffic sent to the current edge computing node to the high-performance edge computing node to cause the high-performance edge computing node to process the received traffic by creating an instance of a number equal to the theoretical instance number, in response to determining that the second difference is greater than the preset difference and the high-performance edge computing node has the instance creating capability greater than the theoretical instance number.

The scenario represented by the second difference being greater than the preset difference is a situation where the difference between the theoretical instance number and the instance creating upper limit is still large even after the execution body creates a service instance of its own instance creating upper limit. For example, the theoretical instance number is 15, but the instance creating upper limit of the execution body is 6, and only three service instances are created currently. Therefore, even if three service instances are added by the execution body, there is still a gap of 9 service instances. If the execution body requests the other edge computing nodes that each does not have many remaining instance addition capabilities to jointly open 15 service instances, the distribution and receiving of the to-be-processed traffic are confusing and easily erroneous.

Therefore, this embodiment selects to query whether there is a high-performance edge computing node having an instance creating capability greater than the theoretical instance number in this case, that is, the instance creating upper limit of the high-performance edge computing node is greater than 15. If there is the high-performance edge computing node, the execution body directly forwards all traffic sent to the current edge computing node to the high-performance edge computing node to cause the high-performance edge computing node to process the received traffic by creating instances of a number equal to the theoretical instance number. The advantage of processing the traffic all by the high-performance edge computing node is that some sudden requests may be better responded to without pouring by the execution body its own limited computing resources on the traffic processing.

Step 405 includes receiving a traffic processing result returned by the high-performance edge computing node.

On the basis of the step 305, this step is intended to receive by the execution body the traffic processing result returned by the high-performance edge computing node.

Further, if the execution body (the current edge computing node) goes offline, the destination address of the traffic sent to the current edge computing node may be modified to the high-performance edge computing node, so that the high-performance edge computing node directly returns the traffic processing result. That is, if the high-performance edge computing node is re-determined as the direct processing node of the to-be-processed traffic by changing the destination, the forwarding by the original edge computing node is no longer required.

Different from the previous embodiment, this embodiment provides a specific implementation for processing the to-be-processed traffic through the high-performance edge computing node for a special case in which the second difference is greater than a preset difference and there is a high-performance edge computing node having an instance creating capability greater than the theoretical instance number, which fully exerts the performance advantages of some high-performance edge computing nodes in the edge computing network.

Figure 5:
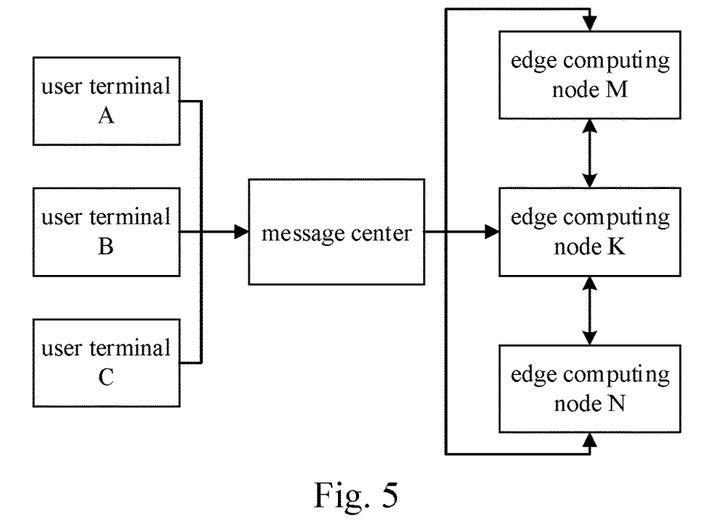
FIG. 5 is a schematic diagram of a connection relationship between a user terminal and an edge computing node in an application scenario provided by an embodiment of the present disclosure.
Figure 6:
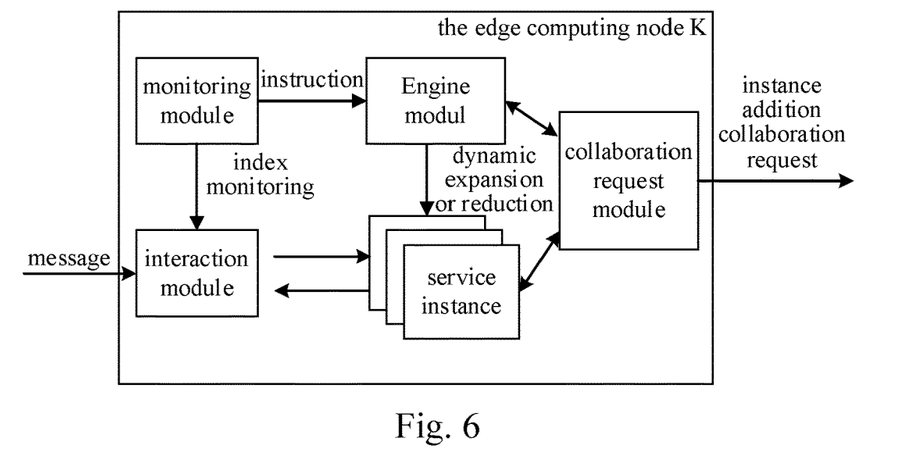
FIG. 6 is a schematic diagram of a connection relationship between internal functional modules provided for the edge computing node of FIG. 5.

For further understanding, the present disclosure also provides a specific implementation solution in combination with a specific application scenario. Referring to FIG. 5 and FIG. 6, FIG. 5 is a schematic diagram of a connection relationship between a user terminal and an edge computing node in an application scenario provided by an embodiment of the present disclosure, and FIG. 6 is a schematic diagram of a connection relationship between internal functional modules provided for the edge computing node of FIG. 5.

As shown in FIG. 5, multiple user terminals (the user terminals A, B and C) interact data with edge computing nodes in an edge computing network based on a publish-subscribe mode, and the subject of the publish-subscribe is mainly recorded in a message center. It is assumed that the edge computing node closest to the user terminals A, B and C is the edge computing node K.

As shown in FIG. 6, the edge computing node K includes an interaction module for performing message interaction with the message center, a monitoring module for determining a performance index in a current time window and issuing a control instruction according to the number of to-be-processed messages received in the interaction module, an engine module for controlling an increase or decrease in the service instance number according to the control instruction issued by the monitoring module, and a collaboration request module for determining whether to send and how to send an instance addition collaboration request according to the current service instance number and an instance creating upper limit of the current node recorded in the engine module.

The user terminals A, B and C send messages to the engagement subject of the message center, and the interaction module subscribes messages of the engagement subject, and the protocols on which the message interaction module depends include, but are not limited to, the standard MQTT (Message Queuing Telemetry Transport) protocol and the standard COAP (Constrained Application Protocol) protocol. Based on a predetermined time window, the monitoring module counts and records the average value of the indexes in the time window. The supported indexes include, but are not limited to, an instance CPU usage rate, an instance memory usage rate or an instance concurrency number. Whether the monitoring module issues a control instruction is based on a comparison result between an actual index and a preset index. The engine module receives the control instruction from the monitoring module and dynamically expand or reduce an instance number of a message processing application based on control instruction, the engine module supporting expansion to a preset maximum instance number and reduction to a minimum instance number, where the minimum instance number may be set to 0 to reduce system resource consumption to the most extent.

The collaboration request module is configured to send an instance addition collaboration request including an instance number equal to or greater than a difference of the instance number to other edge computing nodes (such as the edge computing nodes M and N), upon confirming that the instance expansion number issued by the control instruction is greater than the instance creating upper limit, so that message processing instances of a total number equal to the theoretical instance number may be jointly created with the help of the edge computing nodes M and N.

Figure 7:
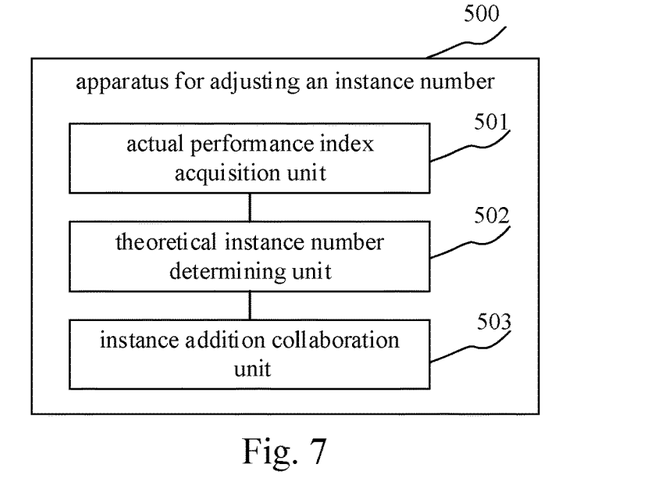
FIG. 7 is a block diagram of an apparatus for adjusting the instance number provided by an embodiment of the present disclosure.

Further referring to FIG. 7, as an implementation of the method shown in each of the above figures, the present disclosure provides an embodiment of an apparatus for adjusting the instance number. The embodiment of the apparatus corresponds to the embodiment of the method shown in FIG. 2, and the apparatus may be applied to various electronic devices.

As shown in FIG. 7, the apparatus 500 for adjusting the instance number of this embodiment may include: an actual performance index acquisition unit 501, a theoretical instance number determining unit 502 and an instance addition collaboration unit 503. The actual performance index acquisition unit 501 is configured to acquire an actual performance index of a current time window; the theoretical instance number determining unit 502 is configured to determine a theoretical instance number corresponding to the actual performance index; and the instance addition collaboration unit 503 is configured to, in response to the theoretical instance number being greater than an instance creating upper limit of a current edge computing node, request another edge computing node having an instance addition capability to jointly create an instance of a total number equal to the theoretical instance number, where different edge computing nodes have different instance creating upper limits due to a performance difference.

In the apparatus 500 for adjusting the instance number of this embodiment, the specific processing of the actual performance index acquisition unit 501, the theoretical instance number determining unit 502 and the instance addition collaboration unit 503 and the technical effects thereof may refer to the related description of the steps 201 to 203 in the corresponding embodiment of FIG. 2 respectively, and details are not described herein.

In some alternative implementations of this embodiment, the instance addition collaboration unit 503 may be further configured to:

calculate a first difference according to the theoretical instance number and the instance creating upper limit;

broadcast an instance addition collaboration request containing the first difference to cause another edge computing node receiving the instance addition collaboration request to return a consent addition response upon confirming that the another edge computing node has the instance addition capability corresponding to the first difference;

forward traffic processed by an instance number corresponding to the first difference to the edge computing node sending the consent addition response according to the received consent addition response; and receive a traffic processing result returned by the edge computing node sending the consent addition response.

In some alternative implementations of this embodiment, the instance addition collaboration unit 503 may be further configured to:

calculate a second difference according to the theoretical instance number and the instance creating upper limit;

in response to determining that the second difference is greater than a preset difference and there is a high-performance edge computing node having an instance creating capability greater than the theoretical instance number, forward all traffic sent to the current edge computing node to the high-performance edge computing node to cause the high-performance edge computing node to process the received traffic by creating an instance of a number equal to the theoretical instance number; and receive a traffic processing result returned by the high-performance edge computing node.

In some alternative implementations of this embodiment, the apparatus 500 for adjusting the instance number may further include:

an offline processing unit configured to, in response to the current edge computing node being offline, modify a destination address of the traffic sent to the current edge computing node to the high-performance edge computing node to cause the high-performance edge computing node to directly return the traffic processing result.

In some alternative implementations of this embodiment, the theoretical instance number determining unit 502 may be further configured to:

in a corresponding table pre-recording a corresponding relationship between performance indexes and instance numbers, query the theoretical instance number corresponding to the actual performance index.

In some alternative implementations of this embodiment, the actual performance index includes at least one of a traffic size, a wait queue length, a CPU usage rate, a memory usage rate or an instance concurrency number.

This embodiment is the apparatus embodiment corresponding to the above method embodiment. In order to meet the requirement of creating an instance number equal to the theoretical instance number to process a corresponding service load, for the case that an edge computing node does not have a sufficient instance addition capability, the apparatus for adjusting the instance number of the present disclosure provides a solution for collaboration creation through requesting another edge computing node having the instance addition capability, to make full use of the edge computing node having the instance addition capability to meet the current overloaded service load, thereby completing the corresponding service load processing more quickly and efficiently.

According to an embodiment of the present disclosure, the present disclosure further provides an electronic device and a computer readable storage medium.

Figure 8:
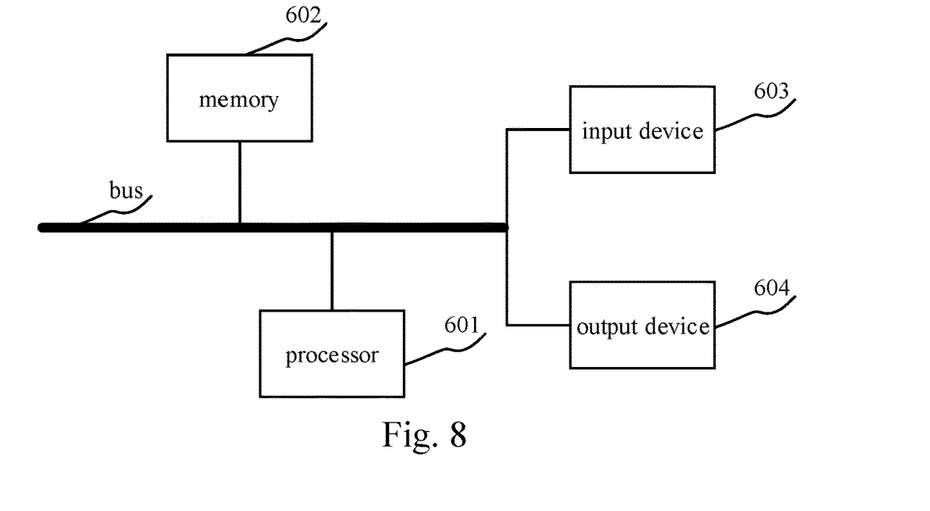
FIG. 8 is a schematic structural diagram of an electronic device adapted to execute the method for adjusting the instance number provided by an embodiment of the present disclosure.

FIG. 8 shows a block diagram of an electronic device adapted to implement the method for adjusting the instance number of an embodiment of the present disclosure. The electronic device is intended to represent various forms of digital computers, such as laptops, desktops, worktables, personal digital assistants, servers, blade servers, mainframe computers and other suitable computers. The electronic device may also represent various forms of mobile devices, such as personal digital processing, cellular phones, smart phones, wearable devices and other similar computing devices. The parts, their connections and relationships, and their functions shown herein are examples only, and are not intended to limit the implementations of the present disclosure as described and/or claimed herein.

As shown in FIG. 8, the electronic device includes one or more processors 601, a memory 602, and interfaces for connecting components, including a high-speed interface and a low-speed interface. The components are interconnected by using different buses and may be mounted on a common motherboard or otherwise as required. The processor may process instructions executed within the electronic device, including instructions stored in memory or on memory to display graphical information of the GUI on an external input or output device (such as a display device coupled to an interface). In other embodiments, multiple processors and/or multiple buses and multiple memories may be used with multiple memories, if required. Similarly, multiple electronic devices may be connected, each of which provides some of the necessary operations (for example, used as a server array, a set of blade servers, or a multiprocessor system). An example of a processor 601 is shown in FIG. 8.

The memory 602 is a non-transitory computer readable storage medium provided by the present disclosure. The memory stores instructions executable by at least one processor to cause the at least one processor to execute the method for adjusting the instance number provided by the present disclosure. The non-transitory computer readable storage medium of the present disclosure stores computer instructions for causing a computer to execute the method for adjusting the instance number provided by the present disclosure.

As a non-transitory computer readable storage medium, the memory 602 may be used to store non-transitory software programs, non-transitory computer executable programs and modules, such as the program instructions or modules corresponding to the method for adjusting the instance number in the embodiment of the present disclosure (such as the actual performance index acquisition unit 501, the theoretical instance number determining unit 502 and the instance addition collaboration unit 503 in FIG. 7). The processor 601 runs the non-transitory software programs, instructions and modules stored in the memory 602 to execute various functional applications and data processing of the server, thereby implementing the method for adjusting the instance number in the embodiment of the method.

The memory 602 may include a storage program area and a storage data area, where the storage program area may store an operating system and an application program required by at least one function; and the storage data area may store data created by the electronic device when executing the method for adjusting the instance number. In addition, the memory 602 may include a high-speed random access memory, and may further include a non-transitory memory, such as at least one magnetic disk storage device, a flash memory or other non-transitory solid state storage devices. In some embodiments, the memory 602 may alternatively include a memory disposed remotely relative to the processor 601, which may be connected through a network to the electronic device adapted to execute the method for adjusting the instance number. Examples of such networks include, but are not limited to, the Internet, enterprise intranets, local area networks, mobile communication networks and combinations thereof.

The electronic device adapted to execute the method for adjusting the instance number may further include an input device 603 and an output device 604. The processor 601, the memory 602, the input device 603 and the output device 604 may be interconnected through a bus or other means, and an example of a connection through a bus is shown in FIG. 8.

The input device 603 may receive input number or character information, and generate key signal input related to user settings and functional control of the electronic device adapted to execute the method for adjusting the instance number, such as a touch screen, a keypad, a mouse, a track pad, a touch pad, a pointer bar, one or more mouse buttons, a trackball, or a joystick. The output device 604 may include a display device, an auxiliary lighting device (such as an LED) and a tactile feedback device (such as a vibration motor), etc. The display device may include, but is not limited to, a liquid crystal display (LCD), a light emitting diode (LED) display and a plasma display. In some embodiments, the display device may be a touch screen.

The various embodiments of the systems and technologies described herein may be implemented in digital electronic circuit systems, integrated circuit systems, ASICs (application specific integrated circuits), computer hardware, firmware, software and/or combinations thereof. The various embodiments may include: being implemented in one or more computer programs, where the one or more computer programs may be executed and/or interpreted on a programmable system including at least one programmable processor, and the programmable processor may be a dedicated or general-purpose programmable processor, which may receive data and instructions from a memory system, at least one input device and at least one output device, and send the data and instructions to the memory system, the at least one input device and the at least one output device.

These computing programs (also known as programs, software, software applications or code) include machine instructions of a programmable processor and may be implemented in high-level procedures and/or object-oriented programming languages, and/or assembly or machine languages. As used herein, the terms "machine readable medium" and "computer readable medium" refer to any computer program product, device and/or apparatus (such as magnetic disk, optical disk, memory and programmable logic device (PLD)) for providing machine instructions and/or data to a programmable processor, including a machine readable medium that receives machine instructions as machine readable signals. The term "machine readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementation of the systems and technologies described herein), or a computing system including any combination of such background component, middleware component, or front-end component. The components of the system may be interconnected by any form or medium of digital data communication (such as a communication network). Examples of communication networks include a local area network (LAN), a wide area network (WAN) and the Internet.

The computer system may include a client and a server. The client and the server are generally remote from each other and interact generally through a communication network. The relationship between the client and the server is generated by running the computer programs having a client-server relationship with each other on the corresponding computer. The server may be a cloud server, also known as a cloud computing server or a cloud host, which is a host product in the cloud computing service system and may solve the defects of difficult management and weak service scalability existing among a conventional physical host and a VPS (Virtual Private Server) service.

In order to meet the requirement of creating an instance number equal to the theoretical instance number to process a corresponding service load, and for the case that an edge computing node does not have a sufficient instance addition capability, the present disclosure provides a solution for collaboration creation through requesting the other edge computing node having the instance addition capability, to make full use of the edge computing node having the instance addition capability to meet the current overloaded service load, thereby completing the corresponding service load processing more quickly and efficiently.

It should be appreciated that the steps of reordering, adding or deleting may be executed using the various forms shown above. For example, the steps described in the present disclosure may be executed in parallel or sequentially or in a different order, so long as the expected results of the technical solutions disclosed in the present disclosure may be realized, and no limitation is imposed herein.

The above specific description is not intended to limit the scope of the present disclosure. It should be appreciated by those skilled in the art that various modifications, combinations, sub-combinations, and substitutions may be made depending on design requirements and other factors. Any modification, equivalent, and modification that fall within the spirit and principles of the present disclosure are intended to be included within the scope of the present disclosure.

What is claimed is:

1. A method for adjusting an instance number, the method comprising:
    acquiring an actual performance index of a current time window, wherein the actual performance index reflects how many resources need to be used by a current edge computing node to complete a to-be-processed task received in the current time window in a preset condition;
    determining a pre-set instance number corresponding to the actual performance index, wherein determining the pre-set instance number corresponding to the actual performance index comprises: querying, in a corresponding table pre-recording a corresponding relationship between performance indexes and instance numbers, the pre-set instance number corresponding to the actual performance index; and
    requesting, in response to the pre-set instance number being greater than an instance creating upper limit of the current edge computing node, another edge computing node having an instance addition capability to jointly create instances of a number equal to the pre-set instance number, wherein different edge computing nodes have different instance creating upper limits due to a performance difference.

2. The method according to claim 1, wherein the requesting another edge computing node having an instance addition capability to jointly create an instance of a number equal to the pre-set instance number, comprises:
    calculating a first difference according to the pre-set instance number and the instance creating upper limit;
    broadcasting an instance addition collaboration request containing the first difference to cause the another edge computing node receiving the instance addition collaboration request to return a consent addition response upon confirming that the another edge computing node has the instance addition capability corresponding to the first difference;

forwarding traffic processed by an instance number corresponding to the first difference to the edge computing node sending the consent addition response, according to the consent addition response; and receiving a traffic processing result returned by the edge computing node sending the consent addition response.

3. The method according to claim 1, wherein the requesting another edge computing node having an instance addition capability to jointly create an instance of a number equal to the pre-set instance number, comprises:

calculating a difference according to the pre-set instance number and the instance creating upper limit;

forwarding, in response to determining that the difference is greater than a preset difference and there is a high-performance edge computing node having an instance creating capability greater than the pre-set instance number, all traffic sent to the current edge computing node to the high-performance edge computing node to cause the high-performance edge computing node to process the traffic by creating the instance of the number equal to the pre-set instance number; and receiving a traffic processing result returned by the high-performance edge computing node.

4. The method according to claim 3, the method further comprising:

modifying, in response to the current edge computing node being offline, a destination address of the traffic sent to the current edge computing node to the high-performance edge computing node to cause the high-performance edge computing node to directly return the traffic processing result.

5. The method according to claim 1, wherein the actual performance index comprises at least one of:

a traffic size, a wait queue length, a CPU usage rate, a memory usage rate or an instance concurrency number.

6. An electronic device, comprising:

at least one processor; and a memory communicating with the at least one processor, wherein the memory stores instructions executable by the at least one processor, and the instructions, when executed by the at least one processor, cause the at least one processor to perform operations comprising:

acquiring an actual performance index of a current time window, wherein the actual performance index reflects how many resources need to be used by a current edge computing node to complete a to-be-processed task received in the current time window in a preset condition;

determining a pre-set instance number corresponding to the actual performance index, wherein determining the pre-set instance number corresponding to the actual performance index comprises: querying, in a corresponding table pre-recording a corresponding relationship between performance indexes and instance numbers, the pre-set instance number corresponding to the actual performance index; and requesting, in response to the pre-set instance number being greater than an instance creating upper limit of the current edge computing node, another edge computing node having an instance addition capability to jointly create instances of a number equal to the pre-set instance number, wherein different edge computing nodes have different instance creating upper limits due to a performance difference.

7. The electronic device according to claim 6, wherein the requesting another edge computing node having an instance addition capability to jointly create an instance of a number equal to the pre-set instance number, comprises:

calculating a first difference according to the pre-set instance number and the instance creating upper limit;

broadcasting an instance addition collaboration request containing the first difference to cause the another edge computing node receiving the instance addition collaboration request to return a consent addition response upon confirming that the another edge computing node has the instance addition capability corresponding to the first difference;

forwarding traffic processed by an instance number corresponding to the first difference to the edge computing node sending the consent addition response, according to the consent addition response; and receiving a traffic processing result returned by the edge computing node sending the consent addition response.

8. The electronic device according to claim 6, wherein the requesting another edge computing node having an instance addition capability to jointly create an instance of a number equal to the pre-set instance number, comprises:

calculating a difference according to the pre-set instance number and the instance creating upper limit;

forwarding, in response to determining that the difference is greater than a preset difference and there is a high-performance edge computing node having an instance creating capability greater than the pre-set instance number, all traffic sent to the current edge computing node to the high-performance edge computing node to cause the high-performance edge computing node to process the traffic by creating the instance of the number equal to the pre-set instance number; and receiving a traffic processing result returned by the high-performance edge computing node.

9. The electronic device according to claim 8, the operations further comprising:

modifying, in response to the current edge computing node being offline, a destination address of the traffic sent to the current edge computing node to the high-performance edge computing node to cause the high-performance edge computing node to directly return the traffic processing result.

10. The electronic device according to claim 6, wherein the actual performance index comprises at least one of:

a traffic size, a wait queue length, a CPU usage rate, a memory usage rate or an instance concurrency number.

11. A non-transitory computer readable storage medium storing computer instructions for causing a computer to perform operations comprising:

acquiring an actual performance index of a current time window, wherein the actual performance index reflects how many resources need to be used by a current edge computing node to complete a to-be-processed task received in the current time window in a preset condition;

determining a pre-set instance number corresponding to the actual performance index, wherein determining the pre-set instance number corresponding to the actual performance index comprises: querying, in a corresponding table pre-recording a corresponding relationship between performance indexes and instance numbers, the pre-set instance number corresponding to the actual performance index; and requesting, in response to the pre-set instance number being greater than an instance creating upper limit of a current edge computing node, another edge computing node having an instance addition capability to jointly create an instance of a number equal to the pre-set instance number, wherein different edge computing nodes have different instance creating upper limits due to a performance difference.

12. The non-transitory computer readable storage medium according to claim 11, wherein the requesting another edge computing node having an instance addition capability to jointly create an instance of a number equal to the pre-set instance number, comprises:

calculating a first difference according to the pre-set instance number and the instance creating upper limit;

broadcasting an instance addition collaboration request containing the first difference to cause the another edge computing node receiving the instance addition collaboration request to return a consent addition response upon confirming that the another edge computing node has the instance addition capability corresponding to the first difference;

forwarding traffic processed by an instance number corresponding to the first difference to the edge computing node sending the consent addition response, according to the consent addition response; and receiving a traffic processing result returned by the edge computing node sending the consent addition response.

13. The non-transitory computer readable storage medium according to claim 11, wherein the requesting another edge computing node having an instance addition capability to jointly create an instance of a number equal to the pre-set instance number, comprises:

calculating a difference according to the pre-set instance number and the instance creating upper limit;

forwarding, in response to determining that the difference is greater than a preset difference and there is a high-performance edge computing node having an instance creating capability greater than the pre-set instance number, all traffic sent to the current edge computing node to the high-performance edge computing node to cause the high-performance edge computing node to process the traffic by creating the instance of the number equal to the pre-set instance number; and receiving a traffic processing result returned by the high-performance edge computing node.

14. The non-transitory computer readable storage medium according to claim 13, the operations further comprising:

modifying, in response to the current edge computing node being offline, a destination address of the traffic sent to the current edge computing node to the high-performance edge computing node to cause the high-performance edge computing node to directly return the traffic processing result.

15. The non-transitory computer readable storage medium according to claim 11, wherein the actual performance index comprises at least one of:

a traffic size, a wait queue length, a CPU usage rate, a memory usage rate or an instance concurrency number.

* * * * *